(12) United States Patent
Ryu et al.

(10) Patent No.: US 11,360,697 B2
(45) Date of Patent: Jun. 14, 2022

(54) APPARATUS AND METHOD FOR ENCODING AND DECODING OPERATIONS TO PROTECT DATA STORED IN A MEMORY SYSTEM

(71) Applicant: SK hynix Inc., Gyeonggi-do (KR)

(72) Inventors: Jun Hee Ryu, Gyeonggi-do (KR); Kwang Jin Ko, Gyeonggi-do (KR); Hyung Jin Lim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/094,152

(22) Filed: Nov. 10, 2020

(65) Prior Publication Data

US 2021/0334034 A1    Oct. 28, 2021

(30) Foreign Application Priority Data

Apr. 23, 2020    (KR) .................. 10-2020-0049392

(51) Int. Cl.
*G06F 3/06*    (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .......................... G06F 3/0655; G06F 3/0604
See application file for complete search history.

(56) References Cited

U.S. PATENT DOCUMENTS

| | | | |
|---|---|---|---|
| 10,298,957 B2 | 5/2019 | Dhuse et al. | |
| 10,394,630 B2 | 8/2019 | Kalaf et al. | |
| 2013/0238836 A1* | 9/2013 | Suzuki | G11C 16/3495 711/103 |
| 2014/0281138 A1* | 9/2014 | Karamcheti | G06F 11/2058 711/103 |
| 2016/0055054 A1* | 2/2016 | Patterson, III | G06F 3/0619 714/6.2 |
| 2018/0115617 A1* | 4/2018 | Kalaf | G06F 11/1076 |
| 2018/0246793 A1* | 8/2018 | Jin | G06F 11/2094 |
| 2019/0391889 A1* | 12/2019 | Luo | G06F 3/0631 |

* cited by examiner

*Primary Examiner* — David Yi
*Assistant Examiner* — Nicholas A. Paperno
(74) *Attorney, Agent, or Firm* — IP & T Group LLP

(57) ABSTRACT

A memory system includes a non-volatile memory device and a controller. The non-volatile memory device includes plural memory groups storing plural chunks. The controller is capable of generating the plural chunks including data chunks and parity chunks based on original data, assign different priorities to the data chunks and the parity chunks, and recovering at least one chunk among the plural chunks based on the different priorities when an operation regarding the at least one chunk fails.

18 Claims, 10 Drawing Sheets

APPARATUS AND METHOD FOR ENCODING AND DECODING OPERATIONS TO PROTECT DATA STORED IN A MEMORY SYSTEM

CROSS-REFERENCE TO RELATED APPLICATION

This patent application claims the benefit of priority under 35 U.S.C. § 119 to Korean Patent Application No. 10-2020-0049392, filed on Apr. 23, 2020, the entire disclosure of which is incorporated herein by reference.

TECHNICAL FIELD

The disclosure relates to a memory system, and more specifically, an apparatus and a method for securing data protection in the memory system.

BACKGROUND

Recently, a paradigm for a computing environment has shifted to ubiquitous computing, which enables computer systems to be accessed virtually anytime, anywhere. As a result, the use of portable electronic devices, such as mobile phones, digital cameras, notebook computers, and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a non-volatile semiconductor memory device is advantageous in that it has excellent stability and durability because it has no mechanical driving part (e.g., a mechanical arm), and has high data access speed and low power consumption. In the context of a memory system having such advantages, an exemplary data storage device includes a universal serial bus (USB) memory device, a memory card having various interfaces, a solid state drive (SSD), or the like.

BRIEF DESCRIPTION OF THE DRAWINGS

The description herein makes reference to the accompanying drawings wherein like reference numerals refer to like parts throughout the figures.

DETAILED DESCRIPTION

Figure 1:
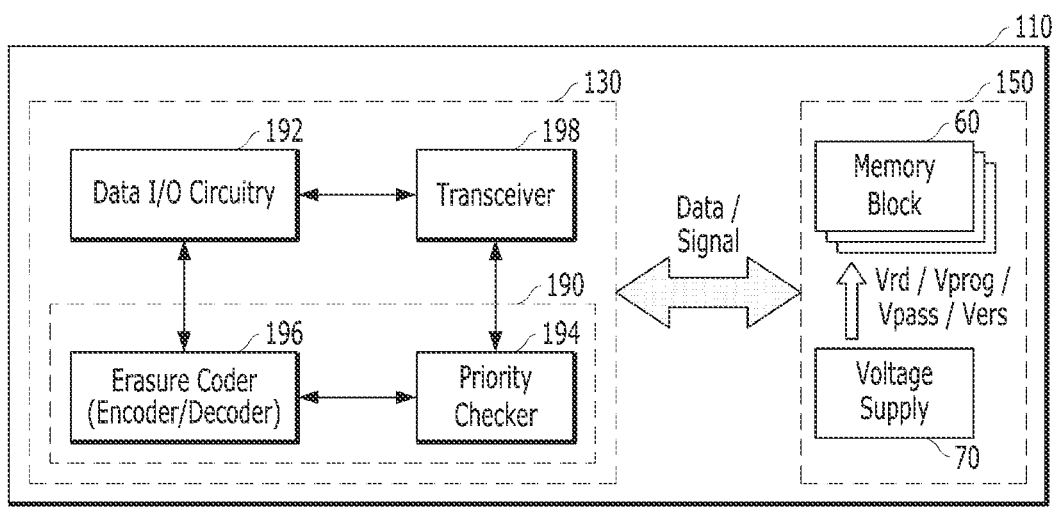
FIG. 1 illustrates a memory system according to an embodiment of the disclosure.

Various embodiments of the disclosure are described below with reference to the accompanying drawings. Elements and features of the disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or might not necessarily be combined in the same embodiments.

In this disclosure, the terms "comprise," "comprising," "include," and "including" are open-ended. As used herein, these terms specify the presence of the stated elements/components and do not preclude the presence or addition of one or more other elements/components.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the unit/circuit/component can be said to be configured to perform the task even when the specified blocks/unit/circuit/component is not currently operational (e.g., is not on). The blocks/units/circuits/components used with the "configured to" language include hardware—for example, circuits, memory storing program instructions executable to implement the operation, etc. Reciting that a block/unit/circuit/component is "configured to" perform one or more tasks is expressly intended not to invoke 35 U.S.C. § 112(f) for that block/unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in the disclosure, the term 'circuitry' refers to any and all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

As used herein, these terms "first," "second," "third," and so on are used as labels for nouns that they precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

An embodiment of the disclosure provides a data process system and a method for operating the data processing system, which includes components and resources such as a memory system and a host, and which is capable of dynamically allocating plural data paths used for data communication between the components based on usages of the components and the resources.

According to an embodiment of the disclosure, a memory system using an erasure coding method may assign different weights or different priorities to data chunks and parity chunks. When a read/program operation regarding the data chunks and the parity chunks is failed in a non-volatile memory device, an apparatus and method capable of performing data recovery can control an operation for recovering the data chunks and the parity chunks in a different way based on the different weights or different priorities, so that the data recovery can be performed quickly.

In an embodiment, a memory system can include a non-volatile memory device including plural memory groups storing plural chunks; and a controller configured to generate the plural chunks including data chunks and parity chunks based on original data, assign different priorities to the data chunks and the parity chunks, and recover at least one chunk among the plurality of chunks based on the different priorities when an operation regarding the at least one chunk fails.

The controller can be configured to program the plural chunks in disparate groups among the plural memory groups, the plural memory groups including plural dies or plural planes which are coupled via different data paths to the controller.

The controller can be configured to divide the original data into m data chunks, generate k parity chunks based on the m data chunks and an erasure code. The 'm' and the 'k' are positive integers and the 'm' is greater than the 'k.'

The controller can be configured to recover the original data based on at least m chunks, when a read or program operation for the at least m chunks among the plural chunks succeeds and a read or program operation for less than k chunks fails.

The controller can be configured to recover the original data based on the m data chunks when a read or program operation for the m data chunks among the plural chunks succeeds and a read or program operation for at least one among the k parity chunks fails.

The controller can be configured to reduce an operation margin for determining whether a read or program operation for the data chunks and the parity chunks succeeds, after a read or program operation for at least one chunk among the m data chunks has failed.

The controller can be configured to advance an operation timing of recovering the original data based on the m data chunks and the k parity chunks, when a read or program operation for at least one chunk among the m data chunks fails.

The controller can be configured to retry a read or program operation for at least one data chunk among the m data chunks that is failed with a higher priority than that for at least one parity chunk among the k parity chunks, when the read or program operation for the at least one data chunk and the at least one parity chunk fails.

The controller can be configured to generate an identifier to identify each of the plural chunks as either a data chunk or a parity chunk.

The controller can be configured to add the identifier, for each of the plural chunks, into meta data of the corresponding chunk.

The controller can be configured to allocate each of the plural memory groups for either one or more of the data chunks or one or more of the parity chunks and program at least one chunk in the memory group based on the identifier.

In another embodiment, a method for operating a memory system can include generating plural chunks including a data chunk and a parity chunk based on original data; assigning different priorities to the data chunk and the parity chunk; and recovering at least one chunk among the plural chunks based on the different priorities when an operation regarding the at least one chunk fails in any of plural memory groups in a memory device.

The method can further include programming the plural chunks in disparate groups among the plural memory groups, the plural memory groups including plural dies or plural planes which are coupled via different data paths to the controller.

The generating the plural chunks can include dividing the original data into m data chunks; and generating k parity chunks based on the m data chunks and an erasure code. The 'm' and the 'k' are positive integers and the 'm' is greater than the 'k.'

The method can further include recovering the original data based on at least m chunks, when a read or program operation for the at least m chunks among the plural chunks succeeds and a read or program operation for less than k chunks among the plural chunks fails.

The method can further include recovering the original data based on the m data chunks when a read or program operation for the m data chunks among the plural chunks succeeds and a read or program operation for at least one among the k parity chunks fails.

The method can further include reducing an operation margin for determining whether a read or program operation for the data chunks and the parity chunks succeeds, after a read or program operation for at least one chunk among the m data chunks has failed.

The method can further include advancing an operation timing of recovering the original data based on the m data chunks and the k parity chunks, when a read or program operation for at least one chunk among the m data chunks fails.

The method can further include retrying a read or program operation for at least one data chunk among the m data chunks that is failed with a higher priority than that for at least one parity chunk among the k parity chunks, when the read or program operation for the at least one data chunk and the at least one parity chunk fails.

The assigning the different priorities can include generating an identifier to identify each of the plural chunks as either a data chunk or a parity chunk; and adding the identifier, for each of the plural chunks, into meta data of the corresponding chunk.

In another embodiment, a memory system can include a memory device including a plurality of memory groups; and a controller configured to: generate a plurality of chunks including multiple data chunks and at least one parity chunk associated with the multiple data chunks; sequentially program the plurality of chunks in the plurality of memory groups; detect whether read operations on one or more data chunks among the multiple data chunks and the parity chunk failed; and recover the one or more data chunks before recovering the parity chunk, when it is detected that the read operations failed.

Embodiments of the disclosure are described below with reference to the accompanying drawings, wherein like numbers reference refers to like elements.

FIG. 1 illustrates a memory system 110 according to an embodiment of the disclosure.

Referring to FIG. 1, the memory system 110 may include a memory device 150 and a controller 130. The memory device 150 and the controller 130 may be considered physically distinct components or elements. In that case, the memory device 150 and the controller 130 may be connected via at least one data path. For example, the data path may include a channel and/or a way.

According to another embodiment, the memory device 150 and the controller 130 may be integrated into a single component or element but functionally divided. According to an embodiment, the memory device 150 and the controller 130 may be implemented with a single chip or a plurality of chips.

The memory device 150 may include a plurality of memory blocks 60, each of which contains a group of non-volatile memory cells in which data is erased together by a single erase operation. Although not illustrated, each of the memory blocks 60 may include pages, a single one of which is a group of non-volatile memory cells that are programmed in a single program operation or from which data is output in a single read operation.

Although not shown in FIG. 1, the memory device 150 may include a plurality of memory planes and/or a plurality of memory dies. According to an embodiment, a memory plane may be considered a logical or a physical partition including at least one memory block 60, a driving circuit capable of controlling an array including a plurality of non-volatile memory cells, and a buffer that can temporarily store data inputted to, or outputted from, non-volatile memory cells.

According to an embodiment, a memory die may include at least one memory plane. A memory die may be understood as a set of components implemented on a physically distinguishable substrate. Each memory die may be connected to the controller 130 through a data path. Each memory die may include an interface to exchange a piece of data and a signal with the controller 130.

The memory device 150 may be configured any of a various suitable ways in terms of memory block(s), memory plane(s) and memory die(s). The internal configuration of the memory device 150 is not limited to that shown in FIG. 1. In general, the configuration of the memory device 150 is determined by intended use and/or desired performance of the memory system 110.

Referring to FIG. 1, the memory device 150 may include a voltage supply circuit 70 capable of supplying at least one voltage into the memory block 60. The voltage supply circuit 70 may supply a read voltage Vrd, a program voltage Vprog, a pass voltage Vpass, or an erase voltage Vers into a non-volatile memory cell in the memory block 60. For example, during a read operation for reading data stored in the non-volatile memory cell in the memory block 60, the voltage supply circuit 70 may supply the read voltage Vrd into a selected non-volatile memory cell. During the program operation for storing data in the non-volatile memory cell in the memory block 60, the voltage supply circuit 70 may supply the program voltage Vprog into a selected non-volatile memory cell. During a read operation or a program operation performed on the selected nonvolatile memory cell, the voltage supply circuit 70 may supply a pass voltage Vpass into a non-selected nonvolatile memory cell. During the erase operation for erasing data stored in the non-volatile memory cell in the memory block 60, the voltage supply circuit 70 may supply the erase voltage Vers into the memory block 60.

In order to store data requested by an external device (e.g., a host 102 in FIGS. 2-3) in the memory device 150 (e.g., a storage space including non-volatile memory cells), the memory system 110 may perform address translation between a file system used by the host 102 with a physical location of the storage space including the non-volatile memory cells. For example, a data address determined according to the file system used by the host 102 may be referred to as a logical address or a logical block address, while an address for the physical location at which data is stored in the storage space may be referred as to a physical address or a physical block address. When the host 102 transfers a logical address to the memory system 110 together with a read request, the memory system 110 searches for a physical address associated with the logical address, reads data stored in a location recognized by the physical address, and outputs read data to the host 102. During this procedure, address translation may be performed in the memory system 110 to search for the physical address associated with the logical address input from the host 102.

The controller 130 may perform a data input/output operation in response to a request input from an external device. For example, when the controller 130 performs a read operation in response to a read request input from the external device, data stored in a plurality of non-volatile memory cells in the memory device 150 is transferred to the controller 130. For the read operation, data input/output (I/O) circuitry 192 may perform address translation on the logical address input from the external device to obtain a physical address, and then transmit a read command to the memory device 150 corresponding to the physical address through a transceiver 198. The transceiver 198 may transmit the read command to the memory device 150 and receive data output from the memory device 150 corresponding to the physical address. The transceiver 198 may store data transferred from the memory device 150 in a memory (e.g., a memory 144 of FIG. 2). The data input/output circuitry 192 may output data stored in the memory to the external device in response to the read request.

The data input/output circuitry 192 may transmit user data input along with a write request from the external device to the memory device 150 through the transceiver 198. After storing the data in the memory device 150, the data input/output circuitry 192 may transmit a response corresponding to the write request to the external device. The data input/output circuitry 192 may update map data that associates the physical address, which indicates a location where the user data in the memory device 150 is stored, with the logical address input along with the write request.

The data input/output circuitry 192 may cause erasure coding circuitry 190 to encode or decode data while writing the data to the memory device 150 or reading the data stored in the memory device 150. The erasure coding circuitry 190 may perform encoding or decoding based on an erasure code. Further, the erasure coding circuitry 190 may assign a priority to a generated or collected chunk or detect a priority assigned to the chunk.

Herein, the erasure coding (EC) may be a kind of data recovery technique that encodes data using an erasure code and recovers original data through a decoding process when the data is lost. Because a parity generated by erasure codes occupies less storage space than data copies or duplication, the erasure coding may improve storage space efficiency in the memory system 110 as well as provide operation reliability of the memory system 110. Various erasure codes may be employed. For example, erasure codes may include Reed-Solomon (RS) Codes, Tahoe Least-Authority File System (Tahoe-LAFS), EVENODD codes, Weaver codes, X-codes, and the like. Different algorithms can be used for different erasure codes. The erasure codes have been developed to improve recovery performance and reduce computational complexity in the memory system 110.

For example, the memory system 110 divides the original data into a plurality of data chunks, generates at least one parity chunk through an encoding process, and then programs the plurality of data chunks and at least one parity chunk into the non-volatile memory device 150. Thereafter, in response to a request input from a host (e.g., host 102 of FIG. 2), the memory system 110 may read the plurality of data chunks and the at least one parity chunk stored in the memory device 150 to output the original data. In a process of reading a plurality of data chunks and at least one parity chunk from the memory device 150, some of the chunks are not transmitted to the controller 130. Even if some chunks are lost, the erasure coding circuitry 190 may recover and restore the original data based on other normally transmitted chunks.

The plurality of data chunks and the at least one parity chunk generated through the erasure coding may be stored in different locations to increase data safety. To this end, the memory system 110 may utilize a redundant arrays of independent disks (RAID) system. In an embodiment, the memory device 150 includes a plurality of non-volatile memory groups which are coupled via different data paths to the controller 130. For instance, the memory device 150 may include a plurality of dies connected to the controller 130 through different channels, and the memory device 150 may include a plurality of planes which are coupled to the controller 130 through different ways, where planes of the same die may use the channel associated with that die. Herein, a plane may include a data input/output buffer such as a page buffer, and thus may be a group of non-volatile memory cells capable of storing data input from the controller 130 or outputting stored data to the controller 130 in an interleaving manner. Each plane may include at least one memory block of the memory blocks 60 shown in FIG. 1.

For example, through an encoding process using erasure coding (EC) (e.g., Reed-Solomon Code), original data is divided into 10 data chunks and 6 parity chunks are generated, resulting 10 data chunks and 6 parity chunks. The 16 chunks may be distributed and stored in 8 planes in the memory device 150. When reading the original data, the controller 130 tries to collect the 16 chunks from the 8 planes. Even when 4 chunks are not normally collected from two of the 8 planes, the original data can be restored based on 12 normally collected chunks among the 16 chunks.

In this case, there may be various causes as to why four chunks are not normally collected from two planes. Such causes include hard disk failure occurring and defects that occur in a plane of the memory device 150. For example, the controller 130 may not be able to recognize data stored in a specific plane, which lack of recognition may be temporary or longer term. For another example, the controller 130 may not be able to collect at least some chunks related to the original data from the corresponding plane in the memory device 150, because of a firmware error in the controller 130, a power supply error to the controller 130 or the corresponding plane, contact failure in a data path such as a channel or way, damage or defect in meta data area associated with the corresponding plane, inability to read or write data due to a bad memory block in the corresponding plane, and the like.

The erasure coding circuitry 190 may recover, reconstruct, or restore the original data by collecting chunks stored in planes other than the plane in which a defect occurs. In the above example, when the original data is divided into 10 data chunks, 6 parity chunks are added, and 16 chunks are distributed and stored in the memory device 150, the original data may be reconstructed even if 6 chunks of the 15 chunks are damaged.

According to an embodiment, the erasure coding circuitry 190 may include an erasure coder 196 and a priority checker 194. The erasure coder 196 may perform an encoding or decoding process based on an erasure code to generate a plurality of chunks. The priority checker 194 may assign different priorities to generated or collected chunks, or detect the priority given to the generated or collected chunks.

The priority checker 194 may assign a higher priority to a data chunk than a parity chunk among the plurality of chunks generated by the erasure coder 196. Data chunks and parity chunks having different priorities may be transmitted to the memory device 150 through the transceiver 198 and then stored in different locations. When an issue occurs in a process of programming data chunks and parity chunks in the memory device 150, the priority checker 194 may control a program operation in a different way. For example, a program failure may occur on some of 16 chunks, including 10 data chunks and 6 parity chunks, while they are individually programmed in the memory device 150. For another example, 10 data chunks are properly stored, i.e., without a problem, and write failure may occur on some of the 6 parity chunks. Because 10 data chunks are completely stored in the memory device 150, the controller 130 may determine that possibility of restoring the original data is high, and may delay the program operation for some of parity chunks that have failed to be programmed in the memory device 150. When another data input/output operation is to be performed by the memory system 110, such operation may be performed before the program operation for failed parity chunks. When the memory system 110 enters the idle state, the controller 130 may access chunks completely programmed in the memory device 150 in relation to the failed parity chunks and restore the original data based on the chunks through an erasure coding (EC). The controller 130 may perform an erasure coding for the restored data, and re-program data chunks and parity chunks generated by the eraser coding (EC) in the memory device 150.

In processes of programming 16 chunks, which is a sum of 10 data chunks and 6 parity chunks, in the memory device 150, 6 parity chunks are properly stored, but write failure for some of 10 data chunks may occur. Because the priority checker 194 has assigned a higher priority to a data chunk than a parity chunk, the controller 130 may determine that there is an issue regarding safety of the data stored in the memory device 150 when a write failure occurs on a data chunk. The controller 130 may perform an operation of programming the data chunk in which a write failure has occurred in the memory device 150 with a higher priority than another input/output operation performed in the memory system 110. According to an embodiment, the controller 130 may change a location where a re-generated data chunk corresponding to previous write failure is stored so that the re-generated data chunk may be programmed in another plane, different from a plane where the previous write failure occurred.

When a write failure regarding a data chunk occurs, the controller 130 may adjust a threshold (e.g., number) regarding program-failed chunks, which is used to determine whether to delay performance of a reprogram operation for the program-failed chunks. The controller 130 may control a write operation in a different way by adjusting the threshold corresponding to safety of data stored in the memory device 150. If the controller 130 lowers the threshold to lower the possibility of delaying the re-program operation, the re-program operation for the program-failed chunks may be performed with a higher priority.

In a process of reading data chunks and parity chunks from the memory device 150, some chunks may not be normally collected (e.g., data may be lost). According to the priority assigned to the data chunk and the parity chunk, the priority checker 194 may determine a data recovery operation in a different way. For example, when 16 chunks, 10 data chunks and 6 parity chunks, are stored in the memory device 150, and 10 data chunks are properly collected, a read failure for some of the 6 parity chunks may occur. Because the controller 130 may restore the original data based on 10 data chunks, it may not perform an additional operation for normally collecting failed parity chunks (i.e., those of 6 parity chunks in which read failure has occurred).

In a case when 16 chunks, 10 data chunks and 6 parity chunks, are stored in the memory device 150, the 6 parity chunks may be normally collected without any problem, but read failure for some of the 10 data chunks may occur. The controller 130 may check whether it is possible to recover or restore original data based on normally collected chunks only, before performing an additional operation for collecting the data chunks in which read failure occurred.

When read failure on a data chunk occurs, the controller 130 may adjust a threshold relevant to the number of read-success chunks (or read-failed chunks) which are collected to recover or restore the original data. For example, when read failure occurs on a data chunk, the controller 130 may lower a threshold for a read-failed chunk. If it is possible to restore original data based on 10 chunks of 16 chunks, the threshold for a read-faded chunk is 6. The controller 130 might not perform an additional operation for normally collecting the read-failed chunks. However, when a read failure occurs for a data chunk, the controller 130 determines that data safety is lowered, and the threshold for the read-failed chunk may be adjusted from 6 to 4, 3, or lower. The controller 130 may improve the data safety of the memory device 150 by lowering the threshold for the read-failed chunk.

In another embodiment, when read failure occurs on a part of the data chunk and a part of the parity chunk among the 16 chunks, the controller 130 may read the data chunk with a higher priority than the parity chunk. When the controller 130 may successfully read the data chunk having the higher priority than the parity chunk, the controller 130 may reduce operation margin or resource consumption to recover or restore the original data because the original data could be recovered or restored based on the read-success data chunk.

According to an embodiment, the memory system 110 may use a certain software storage platform (e.g., Ceph) as a method for storing chunks generated through erasure coding in the memory device 150 in a distributed manner. The Ceph platform is an open source storage platform for distributed cloud storage. As a distributed object storage and file system, the Ceph platform can provide a storage cluster with high performance, stability, and scalability. The Ceph platform may store client data as objects in a storage pool. More specifically, using a method or algorithm called Controlled Replication Under Scalable Hashing (CRUSH), Ceph clusters can be dynamically expanded, rebalanced, and restored. The CRUSH algorithm can determine how to store and retrieve data by calculating a data storage location, such as an object-based storage device (OSD). The CRUSH algorithm may allow Ceph clients to communicate directly with object-based storage devices (OSDs) without going through a central server or a broker. Through algorithm-determined data storage and retrieval methods, the Ceph platform may overcome single points of failure, performance bottlenecks, and physical limitations on scalability. When both the Ceph platform and the CRUSH algorithm are applied, the memory system 110 may use a hierarchical map (or a crush map) to encode information about storage cluster. For example, when the CRUSH algorithm uses the hierarchical map of the storage cluster to create an object-based storage device (OSD), data can be stored and retrieved pseudo-randomly so that a balanced distribution can be achieved.

After receiving data from a Ceph client, a Ceph storage cluster may store such data in the form of an object. Each object may correspond to a file of a file system stored in an object-based storage device (OSD). The CRUSH algorithm may dynamically map a placement group (PG) and an object-based storage device (OSD). When a Ceph client stores an object, the CRUSH algorithm may map each object to the replacement group (PG). The Ceph storage cluster can dynamically expand, contract, or rebalance a location where objects are stored. The CRUSH map of the storage duster may show connection relationships between an object and a replacement group (PG) and between a replacement group (PG) and an object-based storage device (OSD).

Storage access failures in data centers are often temporary. For example, data access is often temporarily restricted due to network failure or system reboot. In the memory system 110, a timer may be set to determine whether failure is temporary in order to avoid the use of too many resources due to hasty recovery. When the erasure coding is employed, it may be possible to delay data recovery until the number of chunks that may not be read/written normally is greater than the threshold. In order to restore a failed data chunk, a delay may occur because plural chunks generated in the encoding process should be collected. The memory system 110 may assign different priorities to data chunks and parity chunks, so that, even though read/write failure occurs, a method of controlling a data recovery and restoration operation may be different according to the priority. Thus, an embodiment of the disclosure is applicable to a case in which a recovery unit is smaller than that of a storage device, like the replacement group PG of the Ceph platform, and data chunks and parity chunks are mixed in one storage device.

Figure 2:
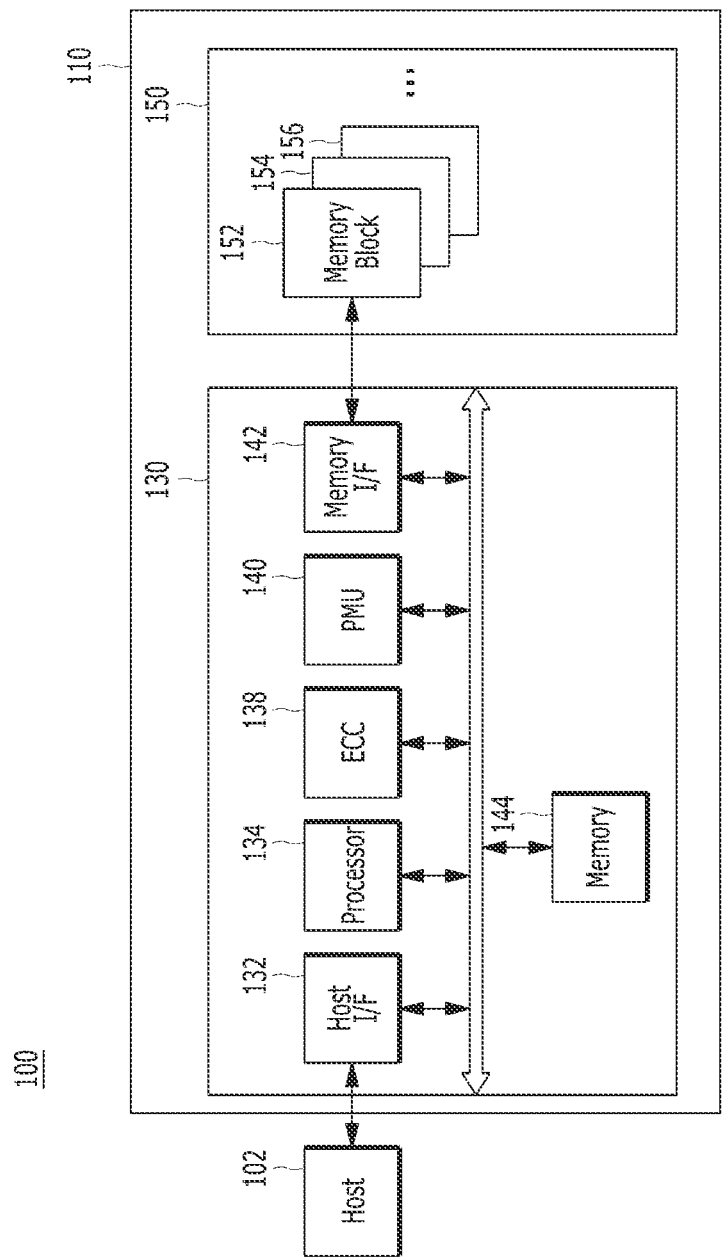
FIG. 2 illustrates a data processing system according to an embodiment of the disclosure.
Figure 3:
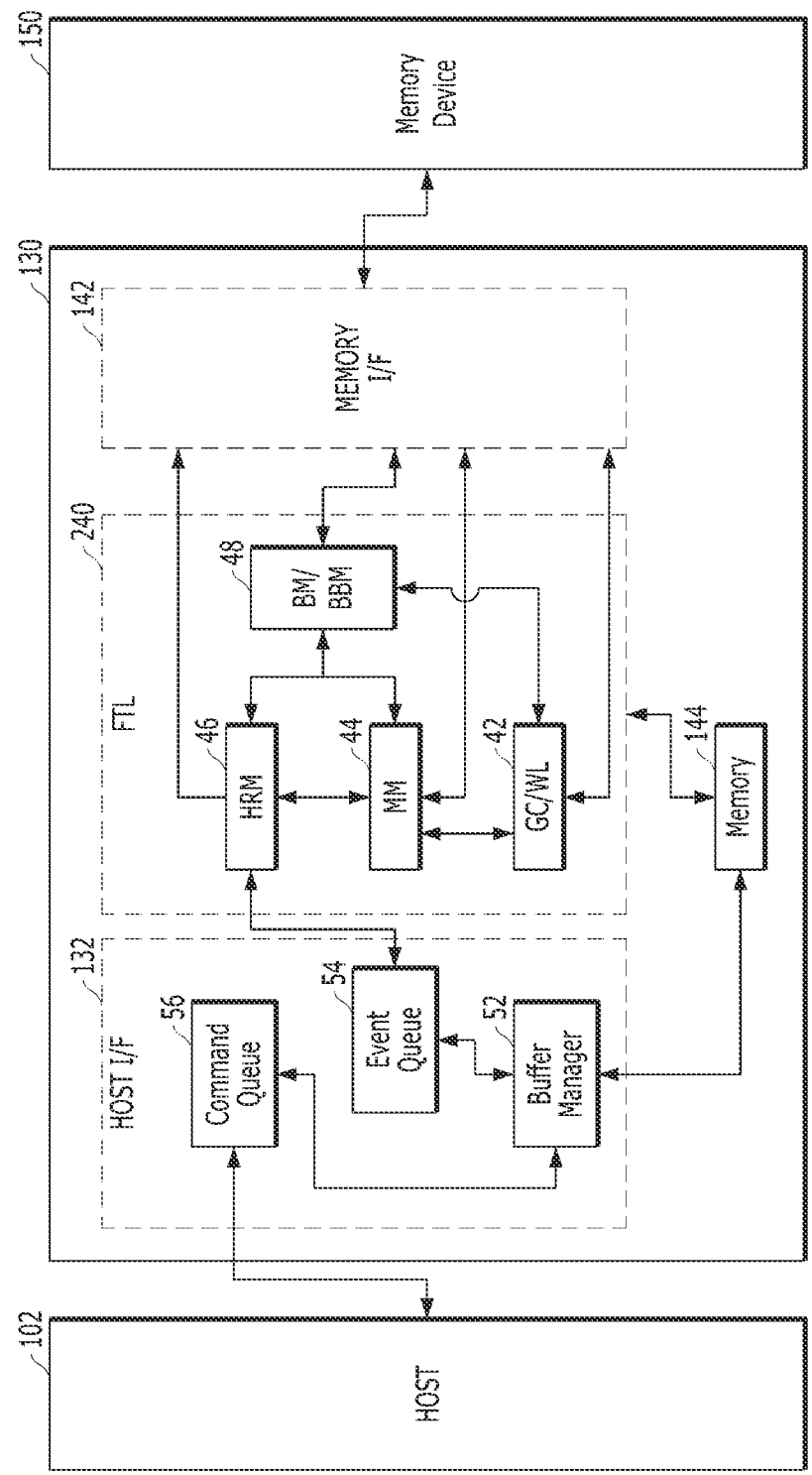
FIG. 3 illustrates a memory system according to an embodiment of the disclosure.

FIGS. 2 and 3 illustrate some operations that may be performed by a memory system 110 in a data processing system 100 according to one or more embodiments.

Referring to FIG. 2, the data processing system 100 may include a host 102 operably engaged with the memory system 110. The host 102 may include a portable electronic device (e.g., a mobile phone, an MP3 player, a laptop computer, etc.) or a non-portable electronic device (e.g., a desktop computer, a game player, a television, a projector, etc.).

The host 102 may also include at least one operating system (OS), which can control functions and operations performed in the host 102. The OS can provide interoperability between the host 102 engaged operatively with the memory system 110 and the user who intends to store data in the memory system 110. The OS may support functions and operations corresponding to user requests. By way of example but not limitation, the OS can be a general operating system and/or a mobile operating system according to mobility of the host 102. The general operating system may be a personal operating system and/or an enterprise operating system according to system requirements or a user environment. As compared with the personal operating system, the enterprise operating system can be specialized for securing and supporting high performance computing.

The mobile operating system may be subject to support services or functions for mobility (e.g., a power saving function). The host 102 may include a plurality of operating systems. The host 102 may execute multiple operating systems interlocked with the memory system 110, corresponding to a user request. The host 102 may transmit a plurality of commands corresponding to the user's requests into the memory system 110, thereby performing operations corresponding to commands within the memory system 110.

The controller 130 in the memory system 110 may control the memory device 150 in response to a request or a command input from the host 102. For example, the controller 130 may perform a read operation to provide a piece of data read from the memory device 150 for the host 102 and may perform a write operation (or a program operation) to store a piece of data input from the host 102 in the memory device 150. In order to perform data input/output (I/O) operations, the controller 130 may control and manage internal operations for data read, data program, data erase, or the like.

According to an embodiment, the controller 130 may include a host interface (I/F) 132, a processor 134, error correction circuitry (i.e., ECC) 138, a power management unit (PMU) 140, a memory interface 142, and a memory 144. The components of the controller 130 are not limited to those illustrated in FIG. 2. Rather, the configuration of the controller 130 may vary according structure, function, operation performance, or the like, of the memory system 110. For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. The specific set of components in the controller 130 may be different depending on the particular implementation of the memory system 110.

The host 102 and the memory system 110 may include a controller or an interface for transmitting and receiving signals, a piece of data, and the like, in accordance with one or more communication protocols. For example, the host interface 132 in the memory system 110 may include an apparatus capable of transmitting signals, a piece of data, and the like, to the host 102 or receiving signals, a piece of data, and the like, input from the host 102.

The host interface 132 may receive signals, commands (or requests), and/or a piece of data input from the host 102. For example, the host 102 and the memory system 110 may use a communicate protocol to transmit and receive a piece of data between each other. Examples of protocols or interfaces supported by the host 102 and the memory system 110 for sending and receiving a piece of data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIS or PCIe), Serial-attached SCSI (SAS), Serial Advanced Technology Attachment (SATA), Mobile Industry Processor Interface (MIPI), and the like. According to an embodiment, the host interface 132 is a kind of layer for exchanging a piece of data with the host 102 and is implemented with, or driven by, firmware called a host interface layer (HIL).

In some embodiments, Integrated Drive Electronics (IDE) or Advanced Technology Attachment (ATA) may be used as one of the interfaces for transmitting and receiving a piece of data between the host 102 and the memory system 110. For example, IDE or ATA may use a cable including 40 wires connected in parallel to support data transmission and reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as the main memory device. For example, IDE or ATA) may include Fast-ATA, ATAPI, and Enhanced IDE (EIDE).

Serial Advanced Technology Attachment (SATA) is a kind of serial data communication interface that is compatible with various ATA standards of parallel data communication interfaces which is used by Integrated Drive Electronics (IDE) devices. The 40 wires in the IDE interface can be reduced to six wires in the SATA interface. For example, 40 parallel signals for the IDE can be converted into 6 serial signals for SATA to be transmitted between each other. SATA has been widely used because of its faster data transmission and reception rate and its less resource consumption in the host 102 used for data transmission and reception. SATA may support connection with up to 30 external devices to a single transceiver included in the host 102. In addition, SATA can support hot plugging that allows an external device to be attached or detached from the host 102, even while data communication between the host 102 and another device is being executed. Thus, the memory system 110 may be connected or disconnected as an additional device, like a device supported by a universal serial bus (USB) even when the host 102 is powered on. For example, in the host 102 having an eSATA port, the memory system 110 may be freely detached like an external hard disk.

Small Computer System Interface (SCSI) is a kind of serial data communication interface used for connection between a computer, a server, and/or other peripheral devices. SCSI can provide a high transmission speed, as compared with other interfaces such as IDE and SATA. In SCSI, the host 102 and at least one peripheral device (e.g., memory system 110) are connected in series, but data transmission and reception between the host 102 and each peripheral device may be performed through a parallel data communication. In SCSI, it is easy to connect to, or disconnect from, the host 102 a device such as the memory system 110. SCSI can support connections of 15 other devices to a single transceiver included in host 102.

Serial Attached SCSI (SAS) can be understood as a serial data communication version of the SCSI. In SAS, not only the host 102 and a plurality of peripheral devices are connected in series, but also data transmission and reception between the host 102 and each peripheral device may be performed in a serial data communication scheme. SAS can support connection between the host 102 and the peripheral device through a serial cable instead of a parallel cable, to easily manage equipment using SAS and enhance or improve operational reliability and communication performance. SAS may support connections of eight external devices to a single transceiver in the host 102.

Non-volatile memory express (NVMe) is a kind of interface based at least on a Peripheral Component Interconnect Express (PCIe) designed to increase performance and design flexibility of the host 102, servers, computing devices, and the like equipped with the non-volatile memory system 110. PCIe can use a slot or a specific cable for connecting the host 102 (e.g., a computing device) and the memory system 110 (e.g., a peripheral device). For example, PCIe can use a plurality of pins (for example, 18 pins, 32 pins, 49 pins, 82 pins, etc.) and at least one wire (e.g. x1, x4, x8, x16, etc.) to achieve high speed data communication over several hundred MB per second (e.g. 250 MB/s, 500 MB/s, 984.6250 MB/s, 1969 MB/s, and etc.). According to an embodiment, the PCIe scheme may achieve bandwidths of tens to hundreds of Giga bits per second. A system using the NVMe can make the most of an operation speed of the non-volatile memory system 110, such as an SSD, which operates at a higher speed than a hard disk.

According to an embodiment, the host 102 and the memory system 110 may be connected through a universal serial bus (USB). USB is a kind of scalable, hot-pluggable plug-and-play serial interface that can provide cost-effective standard connectivity between the host 102 and a peripheral device, such as a keyboard, a mouse, a joystick, a printer, a scanner, a storage device, a modem, a video camera, and the like. A plurality of peripheral devices such as the memory system 110 may be coupled to a single transceiver in the host 102.

Referring to FIG. 2, the error correction circuitry 138 may correct error bits of the data to be processed in (e.g., output from) the memory device 150, which may include an error correction code (ECC) encoder and an ECC decoder. The ECC encoder may perform error correction encoding of data to be programmed in the memory device 150 to generate encoded data into which a parity bit is added and store the encoded data in memory device 150. The ECC decoder may detect and correct errors contained in data read from the memory device 150 when the controller 130 reads the data stored in the memory device 150. For example, after performing error correction decoding on the data read from the memory device 150, the error correction circuitry 138 may determine whether the error correction decoding has succeeded and output an instruction signal (e.g., a correction success signal or a correction fail signal). The error correction circuitry 138 may use a parity bit generated during the ECC encoding process for correcting the error bit of the read data. When the number of the error bits is greater than or equal to a threshold number of correctable error bits, the error correction circuitry 138 might not correct error bits but instead may output an error correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The error correction circuitry 138 may include all circuits, modules, systems, and/or devices for performing the error correction operation based on at least one of the above described codes.

For example, the ECC decoder may perform hard decision decoding or soft decision decoding to data transmitted from the memory device 150. The hard decision decoding can be understood as one of two methods (i.e., the hard decision decoding and the soft decision decoding) broadly classified for error correction. The hard decision decoding may include an operation of correcting an error by reading each bit or piece of digital data from a non-volatile memory cell in the memory device 150 as either '0' or '1'. Because the hard decision decoding handles a binary logic signal, the circuit/algorithm design or configuration may be simpler and processing speed may be faster than soft decision decoding.

Soft decision decoding may quantize a threshold voltage of a non-volatile memory cell in the memory device 150 by two or more quantized values (e.g., multiple bit data, approximate values, an analog value, and the like) in order to correct an error based on the two or more quantized values. The controller 130 may receive two or more alphabets or quantized values from a plurality of non-volatile memory cells in the memory device 150, and then perform decoding based on information generated by characterizing the quantized values as a combination of information such as conditional probability or likelihood.

According to an embodiment, the ECC decoder may use a low-density parity-check and generator matrix (LDPC-GM) code among methods designed for the soft decision decoding. The low-density parity-check (LDPC) code uses an algorithm that can read values of data from the memory device 150 in several bits according to reliability, not simply data of 1 or 0 like hard decision decoding, and iteratively repeats it through message exchange in order to improve reliability of the values. Then, each bit is finally determined as 1 or 0. For example, a decoding algorithm using LDPC codes provides probabilistic decoding. Through hard decision decoding, the value output from a non-volatile memory cell is determined as 0 or 1. Compared to hard decision decoding, soft decision decoding may determine the value stored in the non-volatile memory cell based on the stochastic information. Regarding bit-flipping (which may be considered an error that can occur in the memory device 150), soft decision decoding may provide improved probability of correcting error and recovering data, as well as provide reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) code for soft decision decoding. LDPC-CCs code may use a linear time encoding scheme and pipeline decoding based on a variable block length and a shift register.

According to an embodiment, the ECC decoder may use, for example, a Log Likelihood Ratio Turbo Code (LLR-TC) for soft decision decoding. Log Likelihood Ratio (LLR) may be calculated as a non-linear function for a distance between a sampled value and an ideal value. In addition, Turbo Code (TC) may include a simple code (for example, a Hamming code) in two or three dimensions and repeat decoding in a row direction and a column direction to improve reliability of values.

The power management unit (PMU) 140 may control electrical power provided in the controller 130. The PMU 140 may monitor the electrical power supplied to the memory system 110 (e.g., a voltage supplied to the controller 130) and provide the electrical power to components in the controller 130. The PMU 140 can not only detect power-on or power-off, but also generate a trigger signal to enable the memory system 110 to back up a current state urgently when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory. For example, when the memory device 150 includes a NAND flash memory, the memory interface 142 includes a NAND flash controller (NFC). The memory interface 142 may provide an interface for handling commands and data between the controller 130 and the memory device 150. In accordance with an embodiment, the memory interface 142 may be implemented through, or driven by, firmware called a flash interface layer (FIL) for exchanging data with the memory device 150.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 may be achieved through at least one interface regarding an asynchronous single data rate (SDR), a synchronous double data rate (DDR), and a toggle double data rate (DDR).

The memory 144 may be a type of working memory in the memory system 110 or the controller 130, while storing temporary or transactional data for operations in the memory system 110 and the controller 130. For example, the memory 144 may temporarily store read data output from the memory device 150 in response to a request from the host 102, before the read data is output to the host 102. In addition, the controller 130 may temporarily store write data input from the host 102 in the memory 144, before programming the write data in the memory device 150. When the controller 130 controls operations such as data read, data write, data program, or data erase of the memory device 150, a piece of data transmitted or generated between the controller 130 and the memory device 150 of the memory system 110 may be stored in the memory 144.

In addition to the read data or write data, the memory 144 may store information (e.g., map data, read requests, program requests, etc.) used for inputting or outputting data between the host 102 and the memory device 150. According to an embodiment, the memory 144 may include a command queue, a program memory, a data memory, a write buffer/cache, a read buffer/cache, a data buffer/cache, a map buffer/cache, and/or the like. The controller 130 may allocate some storage space in the memory 144 for a component which is used to carry out a data input/output operation. For example, the write buffer in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates the memory 144 disposed within the controller 130, the embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control overall operation of the memory system 110. For example, the processor 134 may control a program operation or a read operation on the memory device 150, in response to a write request or a read request entered from the host 102. According to an embodiment, the processor 134 may execute firmware to control the program operation or the read operation on the memory system 110. Herein, the firmware may be referred to as a flash translation layer (FTL). An example of the FTL is described below in detail, referring to FIG. 3. According to an embodiment, the processor 134 may be implemented with a microprocessor or a central processing unit (CPU).

According to an embodiment, the memory system 110 may be implemented with at least one mufti-core processor. The multi-core processor is a kind of circuit or chip in which two or more cores, which are considered distinct processing regions, are integrated. For example, when a plurality of cores in the multi-core processor drive or execute a plurality of flash translation layers (FTLs) independently, data input/output speed (or performance) of the memory system 110 may be improved. According to an embodiment, the data input/output (I/O) operations in the memory system 110 may be independently performed through different cores in the multi-core processor.

The processor 134 may perform an operation corresponding to a request or a command input from the host 102. Further, the memory system 110 may be independent of a command or a request input from an external device such as the host 102. In one case, an operation performed by the controller 130 in response to the request or the command input from the host 102 may be considered a foreground operation, while an operation performed by the controller 130 independently (e.g., without a request or command input from the host 102) may be considered a background operation. The controller 130 may perform foreground or background operations for read, write or program, erase and the like, regarding data in the memory device 150. In addition, a parameter set operation corresponding to a set parameter command or a set feature command as a set command transmitted from the host 102 may be considered a foreground operation. As a background operation without a command transmitted from the host 102, the controller 130 may perform garbage collection (GC), wear leveling (WL), bad block management for identifying and processing bad blocks may be performed in relation to a plurality of memory blocks 152, 154, 156 in the memory device 150.

According an embodiment, substantially similar operations may be performed as both the foreground operation and the background operation. For example, when the memory system 110 performs garbage collection in response to a request or a command input from the host 102 (e.g., Manual GC), garbage collection may be considered a foreground operation. When the memory system 110 performs garbage collection independently of the host 102 (e.g., Auto GC), garbage collection may be considered a background operation.

When the memory device 150 includes a plurality of dies (or a plurality of chips) including non-volatile memory cells, the controller 130 may be configured to perform parallel processing regarding plural requests or commands input from the host 102 to improve performance of the memory system 110. For example, the transmitted requests or commands may be distributed to a plurality of dies or a plurality of chips in the memory device 150 and processed simultaneously. The memory interface 142 may be connected to a plurality of dies or chips in the memory device 150 through at least one channel and at least one way. When the controller 130 distributes and stores data in the plurality of dies through each channel or each way in response to requests or commands associated with a plurality of pages including non-volatile memory cells, plural operations corresponding to the requests or the commands may be performed simultaneously or in parallel. Such a processing method or scheme may be considered as an interleaving method. Because data input/output speed of the memory system 110 operating with the interleaving method may be faster than that without the interleaving method, data I/O performance of the memory system 110 may be improved.

By way of example but not limitation, the controller 130 may recognize statuses regarding a plurality of channels (or ways) associated with a plurality of memory dies in the memory device 150. The controller 130 may determine the status of each channel or each way as one of, for example, a busy status, a ready status, an active status, an idle status, a normal status, and/or an abnormal status. The determination of which channel or way an instruction (and/or a data) is delivered through by the controller 130 may be associated with a physical block address, e.g., which die(s) the instruction (and/or the data) is delivered into. The controller 130 may refer to descriptors delivered from the memory device 150. The descriptors may include a block or page of parameters that describe something about the memory device 150, which is data with a set format or structure. For instance, the descriptors may include device descriptors, configuration descriptors, unit descriptors, and the like. The controller 130 may refer to, or use, the descriptors to determine which channel(s) or way(s) an instruction or a data is exchanged via.

The memory device 150 may include the plurality of memory blocks 152, 154, 156. Each of the plurality of memory blocks 152, 154, 156 includes a plurality of non-volatile memory cells. According to an embodiment, the memory block 152, 154, 156 may be a group of non-volatile memory cells erased together. The memory block 152, 154, 156 may include a plurality of pages which is a group of non-volatile memory cells read or programmed together. In one embodiment, each memory block 152, 154, 156 may have a three-dimensional stack structure for a high integration. Further, the memory device 150 may include a plurality of dies, each die including a plurality of planes, each plane including the plurality of memory blocks, e.g., some of all memory blocks 152, 154, 156 in the memory device 150. Configuration of the memory device 150 may be different for different desired performances of the memory system 110.

Each of the plurality of memory blocks 152, 154, 156 may be a single-level cell (SLC) memory block, or a multi-level cell (MLC) Cell) memory block, according to the number of bits that can be stored or represented in one memory cell of that block. An SLC memory block includes a plurality of pages implemented by memory cells, each storing one bit of data. An SLC memory block may have high data I/O operation performance and high durability. An MLC memory block includes a plurality of pages implemented by memory cells, each storing multi-bit data (e.g., two bits or more). An MLC memory block may have larger storage capacity for the same space compared to an SLC memory block. Thus, an MLC memory block may be highly integrated in a view of storage capacity.

In an embodiment, the memory device 150 may be implemented with MLC memory blocks such as double level cell (DLC) memory blocks, triple-level cell (TLC) memory blocks, quadruple-level cell (QLC) memory blocks or a combination thereof. A double-level cell (DLC) memory block may include a plurality of pages implemented by memory cells, each capable of storing 2-bit data. A triple-level cell (TLC) memory block may include a plurality of pages implemented by memory cells, each capable of storing 3-bit data. A quadruple-level cell (QLC) memory block may include a plurality of pages implemented by memory cells, each capable of storing 4-bit data. In another embodiment, the memory device 150 may be implemented with one or more blocks, each of which include a plurality of pages implemented by memory cells, each capable of storing five or more bits of data.

According to an embodiment, the controller 130 may use a multi-level cell (MLC) memory block in the memory system 150 as an SLC memory block. A data input/output speed of the multi-level cell (MLC) memory block may be slower than that of the SLC memory block. That is, when an MLC memory block is used as an SLC memory block, a margin for a read or program operation (e.g., operation-timing margin) may be reduced. The controller 130 may utilize a faster data input/output speed of an MLC memory block when using the MLC memory block as an SLC memory block. For example, the controller 130 may use an MLC memory block as a buffer to temporarily store a piece of data, because the buffer may require a high data input/output speed for improving performance of the memory system 110.

According to an embodiment, the controller 130 may program pieces of data in a multi-level cell (MLC) a plurality of times without performing an erase operation on a specific MLC memory block in the memory system 150. Non-volatile memory cells have a feature that does not support data overwrite. However, the controller 130 may use a feature in which an MLC may store multi-bit data, in order to program plural pieces of 1-bit data in the MLC a plurality of times. For an overwrite operation for MLC, the controller 130 may store the number of program times as separate operation information when a single piece of 1-bit data is programmed in a non-volatile memory cell. According to an embodiment, an operation for uniformly levelling threshold voltages of non-volatile memory cells may be carried out before another piece of data is overwritten in the same non-volatile memory cells.

In an embodiment, the memory device 150 may be embodied as a non-volatile memory such as a flash memory, for example, as a NAND flash memory, a NOR flash memory, and the like. In one embodiment, the memory device 150 may be implemented by at least one of a phase change random access memory (PCRAM), a ferroelectrics random access memory (FRAM), a spin injection magnetic memory, and a spin transfer torque magnetic random access memory (STT-MRAM), or the like.

Referring to FIG. 3, the controller 130 in a memory system operates along with the host 102 and the memory device 150. As illustrated, the controller 130 includes a flash translation layer (FTL) 240, in addition to a host interface 132, the memory interface 142, and the memory 144, which were previously identified in connection with FIG. 2.

According to an embodiment, the error correction circuitry 138 in FIG. 2 may be included in the flash translation layer (FTL) 240. In another embodiment, the error correction circuitry 138 may be implemented as a separate module, a circuit, or firmware, which is included in, or associated with, the controller 130.

The host interface 132 may be capable of handling commands, and data transmitted from the host 102. By way of example but not limitation, the host interface 132 may include a command queue 56, a buffer manager 52, and an event queue 54. The command queue 56 may sequentially store corn lands, and data, which are received from the host 102, and output them to the buffer manager 52, for example, in the order in which they are stored. The buffer manager 52 may classify, manage, or adjust the commands, and the data, which are received from the command queue 56. The event queue 54 may sequentially transmit events for processing the commands and the data received from the buffer manager 52.

A plurality of commands or data of the same characteristic (e.g., read or write commands) may be transmitted from the host 102, or plurality of commands and data of different characteristics may be transmitted to the memory system 110 after being mixed or jumbled by the host 102. For example, a plurality of commands for reading data (read commands) may be delivered, or commands for reading data (read command) and programming/writing data (write command) may be alternately transmitted to the memory system 110. The host interface 132 may store commands and data, which are transmitted from the host 102, to the command queue 56 sequentially. Thereafter, the host interface 132 may estimate or predict what kind of internal operation the controller 130 will perform according to the characteristics of commands and data, which have been received from the host 102. The host interface 132 may determine a processing order and a priority of commands and data, based at least on their characteristics.

According to characteristics of commands and data, which are transmitted from the host 102, the buffer manager 52 in the host interface 132 may determine whether the buffer manager 52 should store commands and data, in the memory 144, or whether the buffer manager 52 should deliver the commands and the data to the flash translation layer 240. The event queue 54 may receive events from the buffer manager 52, which are to be internally executed and processed by the memory system 110 or the controller 130 in response to the commands and the data, which are transmitted from the host 102, in order to deliver the events to the flash translation layer 240 in the order received.

In accordance with an embodiment, the flash translation layer (FTL) 240 illustrated in FIG. 3 may implement a multi-thread scheme to perform the data input/output (I/O) operations. A multi-thread FTL may be implemented through a multi-core processor using multi-thread in the controller 130.

In accordance with an embodiment, the flash translation layer 240 may include a host request manager (HRM) 46, a map manager (MM) 44, a state manager 42, and a block manager 48. The host request manager (HRM) 46 may manage the events from the event queue 54. The map manager (MM) 44 may handle or control a map data. The state manager 42 may perform garbage collection (GC) or wear leveling (WL). The block manager 48 may execute commands or instructions on a block in the memory device 150.

By way of example but not limitation, the host request manager (HRM) 46 may use the map manager (MM) 44 and the block manager 48 to handle or process requests according to the read and program commands, and events which are delivered from the host interface 132. The host request manager (HRM) 46 may send an inquiry request to the map data manager (MM) 44, to determine a physic& address corresponding to the logical address which is received with the events. The host request manager (HRM) 46 may send a read request with the physical address to the memory interface 142, to process the read request (handle the events). In one embodiment, the host request manager (HRM) 46 may send a program request (write request) to the block manager 48 to program data to a specific empty page (no data) in the memory device 150, and then may transmit a map update request corresponding to the program request to the map manager (MM) 44, in order to update an item relevant to the programmed data in information of mapping the logical-physical addresses to each other.

The block manager 48 may convert a program request delivered from the host request manager (HRM) 46, the map data manager (MM) 44, and/or the state manager 42 into a flash program request used for the memory device 150, in order to manage flash blocks in the memory device 150. In order to maximize or enhance program or write performance of the memory system 110, the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

In one embodiment, the block manager 48 may be configured to manage blocks in the memory device 150 according to the number of valid pages, select and erase blocks having no valid pages when a free block is needed, and select a block including the least number of valid pages when it is determined that garbage collection is to be performed. The state manager 42 may perform garbage collection to move the valid data from the selected block(s) to an empty block and erase the block(s) containing the moved valid data so that the block manager 48 may have enough free blocks (i.e., empty blocks with no data). When the block manager 48 provides information regarding a block to be erased to the state manager 42, the state manager 42 may check all flash pages of the block to be erased to determine whether each page is valid.

For example, to determine validity of each page, the state manager 42 may identify a logical address recorded in an out-of-band (OOB) area of each page. To determine whether each page is valid, the state manager 42 may compare the physical address of the page with the physical address mapped to the logical address obtained from the inquiry request. The state manager 42 sends a program request to the block manager 48 for each valid page. A mapping table may be updated through the update of the map manager 44 when the program operation is complete.

The map manager 44 may manage a logical-to-physical (L2P) mapping table. The map manager 44 may process various requests, for example, queries and updates, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a dean cache block is made and the dirty map table may be stored in the memory device 150.

When garbage collection is performed, the state manager 42 copies valid page(s) into a free block, and the host request manager 46 may program the latest version of the data for the same logical address of the page and currently issue an update request. When the status manager 42 requests the map update in a state in which copying of valid page(s) has not been properly completed, the map manager 44 might not perform the mapping table update. This is because the map request is issued with old physical information when the status manger 42 requests a map update and a valid page copy is completed later. The map manager 44 may perform a map update operation to ensure accuracy when, or only if, the latest map table still points to the old physical address.

Figure 4:
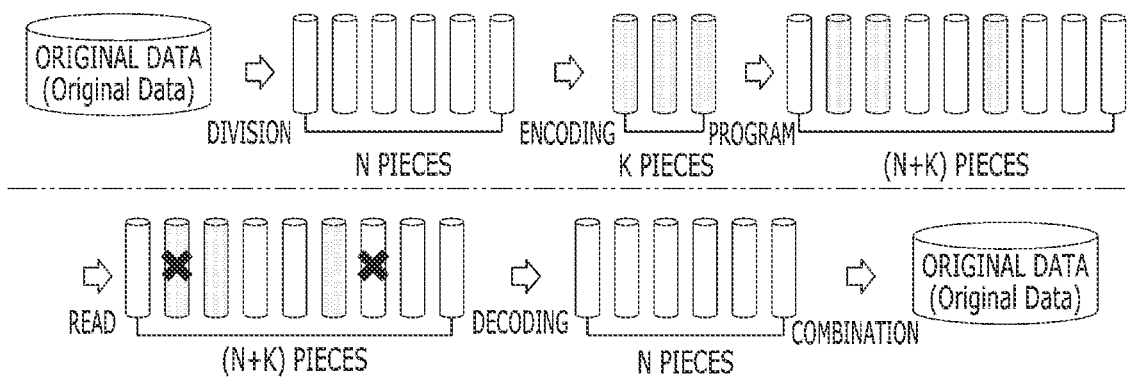
FIG. 4 illustrates an erasure coding method according to an embodiment of the disclosure.

FIG. 4 illustrates an erasure coding method according to an embodiment of the disclosure. By way of example, FIG. 4 illustrates an encoding/decoding operation performed by the erasure coder 196 of the erasure coding circuitry 190 in FIG. 1.

Referring to FIG. 4, original data may be encoded using an erasure code and then stored in the memory device 150. First, the original data may be divided into N data chunks, i.e., N pieces. Through an encoding operation on N data chunks, K parity chunks, i.e., K pieces, may be generated. Thereafter, (N+K) chunks, i.e., (N+K) pieces, including N data chunks and K parity chunks, may be stored in the memory device 150.

When a read request for the original data occurs, the controller 130 may read the (N+K) chunks, i.e., (N+K) pieces, from the memory device 150. As shown in FIG. 4, it is assumed that one data chunk and one parity chunk among (N+K) chunks are lost (i.e., have an uncorrectable error). Although two chunks among the (N+K) chunks are lost, it is possible to restore and recover the N data chunks, i.e., N pieces, through a decoding operation using an erasure code. By combining the N data chunks, the memory system 110 may recover the original data.

According to an embodiment, the number of data chunks, the number of parity chunks, and recoverable tolerance may be different for different algorithms and erasure codes employed in the erasure coding method.

Referring to FIGS. 1 to 4, in order to store a plurality of chunks, generated through the erasure coding method, in the memory device 150, the memory system 110 may be configured as a redundant array of independent disks (RAID) systems, or employ a platform such as Ceph for distributed processing systems like a data center. By way of example, FIG. 5 illustrates a method for storing a plurality of chunks generated through the erasure coding method in the memory device 150.

Figure 5:
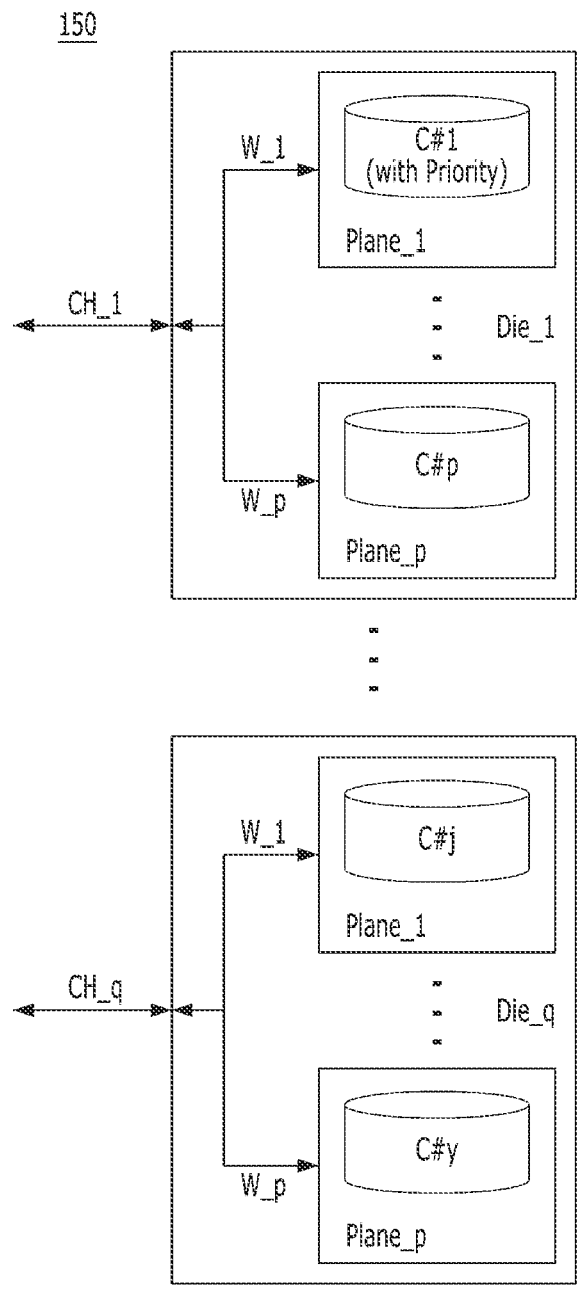
FIG. 5 illustrates a method for storing a plurality of chunks generated through the erasure coding method in the memory device.

Referring to FIG. 5, the memory device 150 may include a plurality of dies Die_1 to Die_q, where q is an integer of 2 or more. The plurality of dies Die_1 to Die_q may be coupled to the controller 130 through a plurality of channels CH_1 to CH_q, respectively. Each of dies Die_1 to Die_q may include a plurality of planes Plane_1 to Plane_p. Each of the planes Plane_1 to Plane_p may be coupled to the channels of the associated die through different ways W_1 to W_p, respectively. The plurality of channels CH_1 to CH_q and the plurality of ways W_1 to W_p may provide different data paths for coupling the plurality of planes Plane_1 to Plane_p to the controller 130.

A plurality of chunks C #1 to C #p, . . . , C #j to C #y generated through erasure coding (EC) are distributed and stored in a plurality of planes Plane_1 to Plane_p in the plurality of dies Die_1 to Die_q of the memory device 150. At least one chunk (e.g., C #1) of the plurality of chunks may have the priority assigned by the priority checker 194 in FIG. 1. Although not shown, the priority may have a fixed format such as a tag or an identifier. Further, the priority may be configured in a bitmap form or stored together with meta data.

According to an embodiment, the plurality of chunks C #1 to C #p, . . . , C #j to C #y generated through the erasure coding (EC) method may be distributed and stored in all or some of the plurality of planes Plane_1 to Plane_p in the memory device 150. According to an embodiment, the controller 130 may determine in advance whether to store either a data chunk or a parity chunk in the plurality of planes Plane_1 to Plane_p in the memory device 150. Alternatively, the controller 130 may store the data chunk or the parity chunk in a plane allocated based on a type of chunks.

Figure 6:
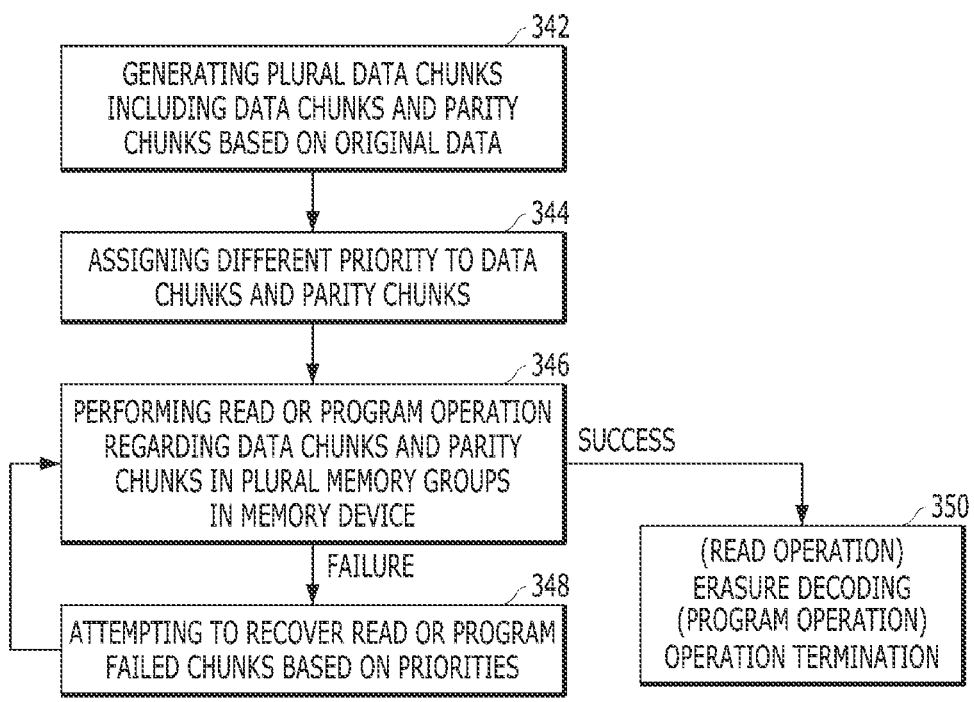
FIG. 6 illustrates a method for operating a memory system according to an embodiment of the disclosure.

FIG. 6 illustrates a method for operating a memory system according to an embodiment of the disclosure. Specifically, FIG. 6 illustrates a read/write operation in the memory system 110 employing an erasure coding method.

Referring to FIG. 6, the method for operating the memory system 110 includes generating a plurality of chunks including data chunks and parity chunks based on original data (342), assigning different priorities to the data chunks and the parity chunks (344), performing a read or program operation on the data chunks and the parity chunks in a plurality of memory groups in the memory device 150 (346).

Success in programming or reading data chunks and parity chunks in the memory device 150 may be different from success of an erasure decoding performed by the erasure coder 196 in FIG. 1 (or an operation performed by the error correction circuitry 138 in FIG. 2). Success in programming or reading the data chunks and the parity chunks may include whether the controller 130 normally or properly collects the data chunks and the parity chunks through the transceiver 198 in FIG. 1 or the memory interface 142 in FIGS. 2 to 3 (e.g., the data chunks and the parity chunks are not lost).

When the data chunks and the parity chunks are completely programmed in the memory device 150, the program operation may be terminated (350). When the data chunks and the parity chunks from the memory device 150 are successfully read, the original data may be restored by performing the erasure decoding (350).

If read failure or program failure occurs for at least one of the data chunks and parity chunks during a read operation or a write operation, the controller 130 may attempt to recover the failed chunk(s) according to the priority assigned to the data chunk and parity chunk (348). For example, when read failure or write failure occurs on a parity chunk, a recovery operation for the failed parity chunk may be delayed. On the other hand, when read failure or write failure occurs on a data chunk, a recovery operation for the failed data chunk may be performed immediately. According to an embodiment, when the read failure or write failure occurs on the data chunk, a timer for performing a recovery operation may be adjusted so as to advance the recovery operation. Alternatively, the controller 130 may adjust the threshold for determining whether to perform the recovery operation.

Figure 7:
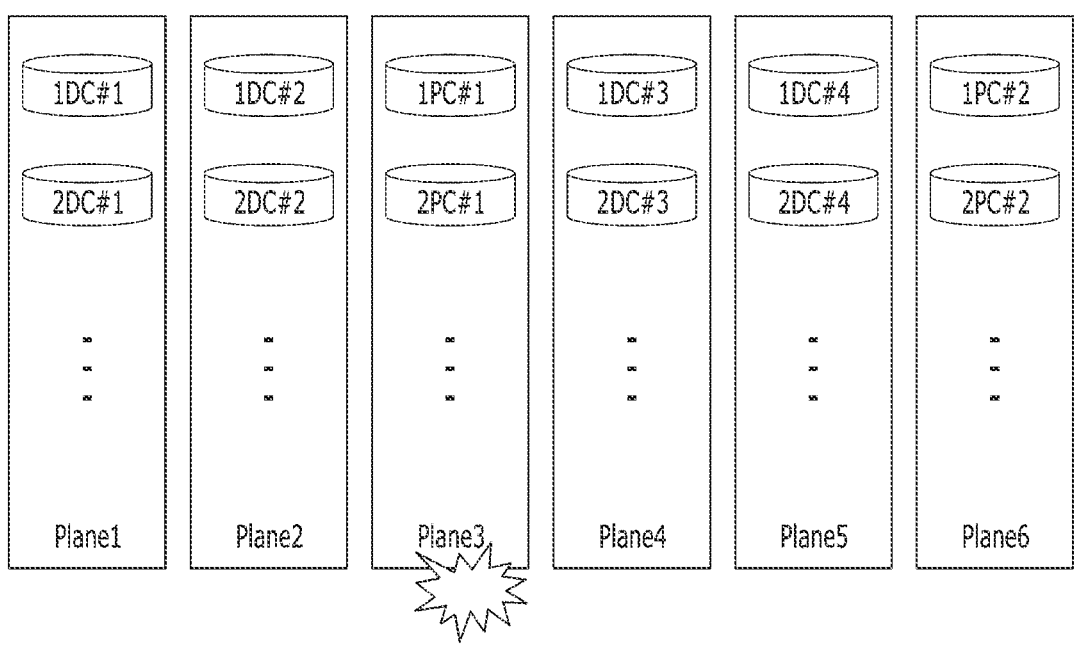
FIG. 7 illustrates a first example of a method of operating a memory system according to an embodiment of the disclosure.
Figure 8:
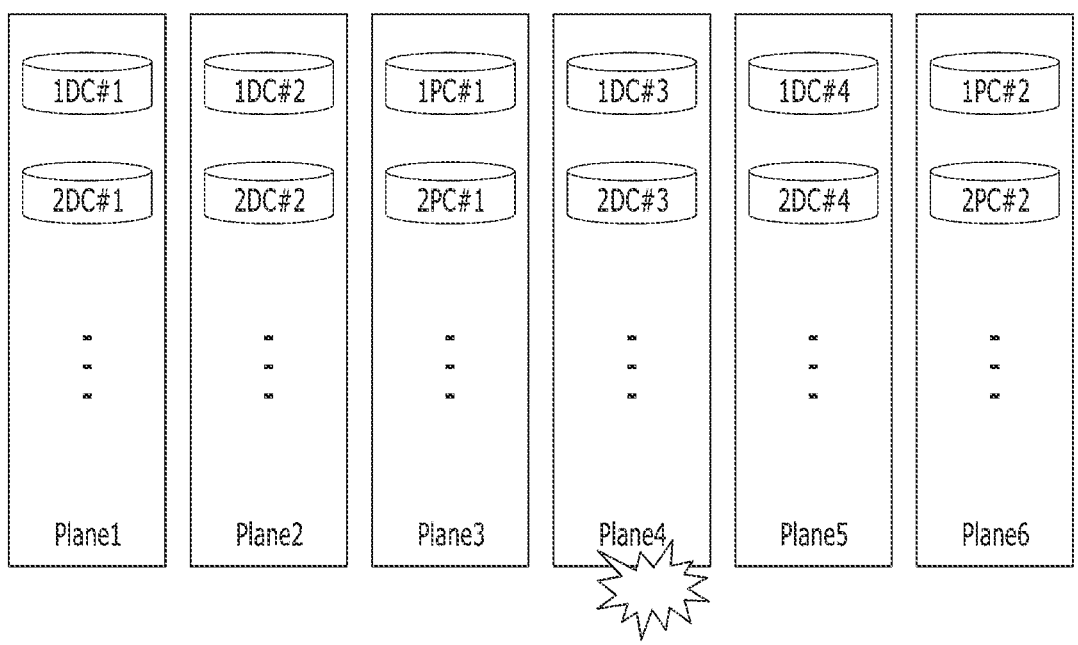
FIG. 8 illustrates a second example of a method for operating a memory system according to an embodiment of the disclosure.
Figure 9:
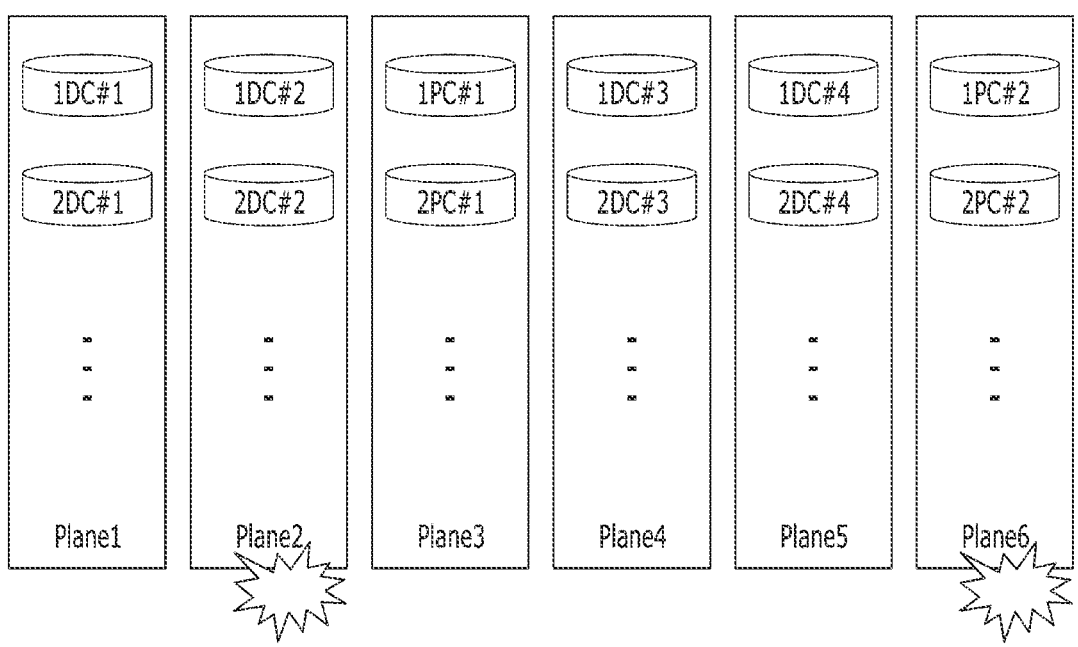
FIG. 9 illustrates a third example of a method for operating a memory system according to an embodiment of the disclosure.

Hereinafter, with reference to FIGS. 7 to 10, it will be described that the method of operating the memory system 110 may differ based on different priorities assigned to the data chunk(s) and the parity chunk(s). In FIGS. 7 to 9, it is assumed that four data chunks and two parity chunks are generated based on original data through the erasure coding (EC) method, and all six chunks are stored in six planes Plane1 to Plane6 individually. Referring to FIGS. 7 to 9, four data chunks 1DC #1, 1DC #2, 1DC #3, 1DC #4 and two parity chunks 1PC #1, 1PC #2, generated based on first original data through the erasure coding (EC) method, are stored in six planes Plane1 to Plane6 of the memory device 150. In addition, four data chunks 2DC #1, 2DC #2, 2DC #3, 2DC #4 and two parity chunks 2PC #1, 2PC #2 generated based on second original data through the erasure coding (EC) method, may be stored in 6 planes Plane1 to Plane6 individually. That is, each plane stores a respective one of the first original data chunks and a respective one of the second original data chunks.

FIG. 7 illustrates a first example of a method of operating a memory system according to an embodiment of the disclosure.

Referring to FIG. 7, when a temporary or longer term defect occurs in a third plane Plane3 among the six planes Plane1 to Plane6, read failure may occur when the controller 130 performs a read operation on first parity chunks 1PC #1, 2PC #1 individually associated with the first origin& data or the second original data. Although the read failure has occurred on some of the parity chunks, the controller 130 may determine that it is possible to restore or recover the first original data or the second original data based on the four data chunks 1DC #1 to 1DC #4, 2DC #1 to 2DC #4 which are normally or properly collected. In this case, the controller 130 may delay a recovery operation regarding the read failure for the first parity chunks 1PC #1, 2PC #1.

FIG. 8 illustrates a second example of a method for operating a memory system according to an embodiment of the disclosure.

Referring to FIG. 8, when a temporary or longer term defect occurs in a fourth plane Plane4 among the six planes Plane1 to Plane6, read failure may occur when the controller 130 performs a read operation on third data chunks 1DC #3, 2DC #3 individually associated with the first original data or the second original data. Because the read failure has occurred on the data chunk, the controller 130 may determine that safety of data stored in the memory device 150 is lower. According to an embodiment, the controller 130 may collect three data chunks 1DC #1 to 1DC #2, 1DC #4, 2DC #1 to 2DC #2, 2DC #4 and two parity chunks 1PC #1 to 1PC #2, 2PC #1 to 2PC #2, which are normally read. Based on collected chunks, the controller 130 may determine that an erasure decoding for restoring the first original data or the second original data may be completely performed. According to an embodiment, the controller 130 may immediately perform a recovery operation for read failure on the third data chunks 1DC #3, 2DC #3, or adjust a timer or a threshold capable of delaying or advancing the recovery operation for read failure on the third data chunks 1DC #3, 2DC #3.

FIG. 9 illustrates a third example of a method for operating a memory system according to an embodiment of the disclosure.

Referring to FIG. 9, when a temporary or longer term defect occurs in a second plane Plane2 and a sixth plane Plane6 among the six planes Plane1 to Plane6, read failure may occur when the controller 130 performs a read operation on second data chunks 1DC #2, 2DC #2 and second parity chunks 1PC #2, 2PC #2 individually associated with the first original data or the second original data. Because a read failure occurs on the data chunk and the parity chunk, the controller 130 may determine that safety of data stored in the memory device 150 is lower. According to an embodiment, when satisfying recoverable tolerance shown in FIG. 4, the controller 130 may perform an erasure decoding for restoring the first original data or the second original data immediately based on three data chunks 1DC #1, 1DC #3 to 1DC #4, 2DC #1, 2DC #3 to 2DC #4 and one parity chunk 1PC #1, 2PC #1. In addition, according to an embodiment, the controller 130 may perform a recovery operation for a read failure on the second data chunks 1DC #2, 2DC #2 with a higher priority than that on the second parity chunks 1PC #2 and 2PC #2. That is, the recovery operation on the second data chunks 1DC #2, 2DC #2 is performed before the recovery operation on the second parity chunks 1PC #2 and 2PC #2.

Figure 10:
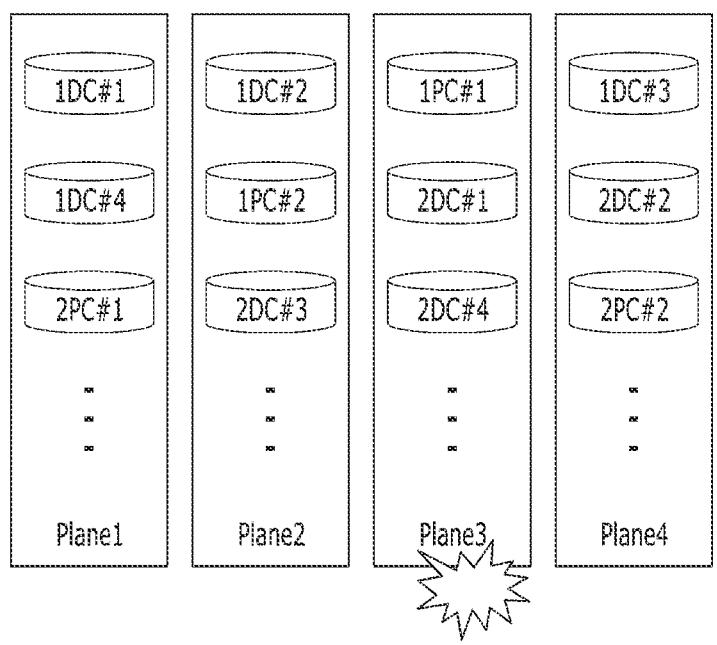
FIG. 10 illustrates a fourth example of a method for operating a memory system according to an embodiment of the disclosure.

FIG. 10 illustrates a fourth example of a method for operating a memory system according to an embodiment of the disclosure. In FIG. 10, it is assumed that four data chunks and two parity chunks are generated based on the original data through the erasure coding (EC) method, and the six chunks in total are stored in four planes Plane1 to Plane4, Referring to FIG. 10, four data chunks 1DC #1, 1DC #2, 1DC #3, 1DC #4 and two parity chunks 1PC #1, 1PC #2 are generated based on the first original data through an erasure coding (EC) method, and these chunks are distributed and stored in the four planes Plane1 to Plane4 of the memory device 150, as shown in FIG. 10. In addition, the controller 130 may perform erasure coding (EC) on the second original data to generate four data chunks 2DC #1, 2DC #2, 2DC #3, 2DC #4 and two parity chunks 2PC #1, 2PC #2, which chunks are then stored in the four planes Plane1 to Plane4. According to an embodiment, the chunks may be stored sequentially or randomly.

Referring to FIG. 10, it is assumed that a temporary or longer term defect occurs in a third plane Plane3 among the four planes Plane1 to Plan4. While performing an operation in response to a request for the first original data, the controller 130 may collect six chunks associated with the first original data. But, read failure may occur on the first parity chunk 1PC #1 associated with the first original data. Although the read failure occurred on the parity chunk, the controller 130 may determine that there is no failure in restoring the first original data based on the four data chunks 1DC #1 to 1DC #4 which are normally collected. In this case, the controller 130 may delay a recovery operation for the read failure on the first parity chunk 1PC #1.

While performing an operation in response to a request for the second original data, the control 130 may collect the six chunks associated with the second original data. But, read failure may occur on the first and fourth data chunks 2DC #1, 2DC #4 of the second original data. Because the read failure has occurred on data chunks, the controller 130 may determine that safety of data stored in the memory device 150 is lower. According to an embodiment, when the recoverable tolerance is satisfied, the controller 130 may restore the second original data through an erase decoding based on two data chunks 2DC #2, 2DC #3 and two parity chunks 2PC #1, 2PC #2 which are normally collected. In addition, according to an embodiment, the controller 130 may immediately perform a recovery operation for the read failure on the first and fourth data chunks 2DC #1, 2DC #4. Further, the controller 130 may adjust a timer or threshold to make the recovery operation run faster.

According to an embodiment, in response to the priorities given to the data chunk and the parity chunk, the recovery operation for the read failure on the first parity chunk (1PC #1) associated with the first origin& data may be delayed more than that on the first and fourth data chunks 2DC #1 and 2DC #4 associated with the second original data. In a delayed recovery scheme for a read failure where the controller 130 uses the priorities given to data chunks and parity chunks, the memory system 110 may improve data access performance through faster recovery of data chunks than parity chunks. In addition, by prioritizing recovery of data chunks over recovery of parity chunks, the memory system 110 may reduce contention for resources used for the recovery operation, so as to achieve fast recovery and increase data access speed.

In the memory system according to an embodiment of the disclosure, when a data read/write operation in a nonvolatile memory device fails, a recovery operation for the original data may be performed more quickly based on whether an error occurs in a data chunk or a parity chunk generated according to an erasure coding method.

In addition, the memory system according to another embodiment of the disclosure may assign different priorities or weights to data chunks and parity chunks generated according to the erasure coding method, control allocation of resources to recover chunks input to or output from a non-volatile memory device, and improve operation performance or input/output performance of the memory system.

While the present teachings have been illustrated and described with respect to specific embodiments, it will be apparent to those skilled in the art in light of the present disclosure that various changes and modifications may be made without departing from the spirit and scope of the invention as defined in the following claims.

What is claimed is:

1. A memory system, comprising:
a non-volatile memory device including plural memory groups storing plural chunks; and
a controller configured to generate the plural chunks including data chunks and parity chunks based on original data, assign different priorities to the data chunks and the parity chunks, and recover at least one chunk among the plural chunks based on the priorities when an operation regarding the at least one chunk fails,
wherein the controller is configured to divide the original data into m data chunks, generate k parity chunks based on the m data chunks and an erasure code, and
wherein m and k are positive integers and m is greater than k, and the m data chunks have a higher priority than the k parity chunks do.

2. The memory system according to claim 1, wherein the controller is configured to program the plural chunks in disparate groups among the plural memory groups, the plural memory groups including plural dies or plural planes which are coupled via different data paths to the controller.

3. The memory system according to claim 1, wherein the controller is configured to recover the original data based on at least m chunks, when a read or program operation for the at least m chunks among the plural chunks succeeds and a read or program operation for less than k chunks among the plural chunks fails.

4. The memory system according to claim 1, wherein the controller is configured to recover the original data based on the m data chunks when a read or program operation for the m data chunks succeeds and a read or program operation for at least one among the k parity chunks fails.

5. The memory system according to claim 1, wherein the controller is configured to reduce an operation margin for determining whether a read or program operation for the data chunks and the parity chunks succeeds, after a read or program operation for at least one chunk among the m data chunks has failed.

6. The memory system according to claim 1, wherein the controller is configured to advance an operation timing of recovering the original data based on the m data chunks and the k parity chunks, when a read or program operation for at least one chunk among the m data chunks fails.

7. The memory system according to claim 1, wherein the controller is configured to retry a read or program operation for at least one data chunk among the m data chunks, when the read or program operation for the at least one data chunk and the at least one parity chunk fails.

8. The memory system according to claim 1, wherein the controller is configured to generate an identifier to identify each of the plural chunks as either a data chunk or a parity chunk.

9. The memory system according to claim 8, wherein the controller is configured to add the identifier, for each of the plural chunks, into meta data of the corresponding chunk.

10. The memory system according to claim 8, wherein the controller is configured to allocate each of the plural memory groups for either one or more of the data chunks or one or more of the parity chunks and program at least one chunk in the memory group based on the identifier.

11. A method for operating a memory system, comprising:
generating plural chunks including data chunks and parity chunks based on original data;
assigning different priorities to the data chunks and the parity chunks; and
recovering at least one chunk among the plural chunks based on the priorities when an operation regarding the at least one chunk fails in any of plural memory groups in a memory device,
wherein the generating the plural chunks includes:
dividing the original data into m data chunks; and
generating k parity chunks based on the m data chunks and an erasure code,
wherein m and k are positive integers and m is greater than k, and the m data chunks have a higher priority than the k parity chunks do.

12. The method according to claim 11, further comprising:
programming the plural chunks in disparate groups among the plural memory groups, the plural memory groups including plural dies or plural planes which are coupled via different data paths to the controller.

13. The method according to claim 11, further comprising:
recovering the original data based on at least m chunks, when a read or program operation for the at least m chunks among the plural chunks succeeds and a read or program operation for less than k chunks among the plural chunks fails.

14. The method according to claim 11, further comprising:
recovering the original data based on the m data chunks when a read or program operation for the m data chunks among the plural chunks succeeds and a read or program operation for at least one among the k parity chunks fails.

15. The method according to claim 11, further comprising:
reducing an operation margin for determining whether a read or program operation for the data chunks and the parity chunks succeeds, after a read or program operation for at least one chunk among the m data chunks has failed.

16. The method according to claim 11, further comprising:
advancing an operation timing of recovering the original data based on the m data chunks and the k parity chunks, when a read or program operation for at least one chunk among the m data chunks fails.

17. The method according to claim 11, further comprising:
retrying a read or program operation for at least one data chunk among the m data chunks, when the read or program operation for the at least one data chunk and the at least one parity chunk fails.

18. The method according to claim 11, wherein the assigning the different priorities includes:
generating an identifier to identify each of the plural chunks as either a data chunk or a parity chunk; and
adding the identifier, for each of the plural chunks, into meta data of the corresponding chunk.

* * * * *